No. 644,386. Patented Feb. 27, 1900.
J. W. WATTS.
FISH TRAP.
(Application filed Oct. 4, 1899.)
(No Model.)
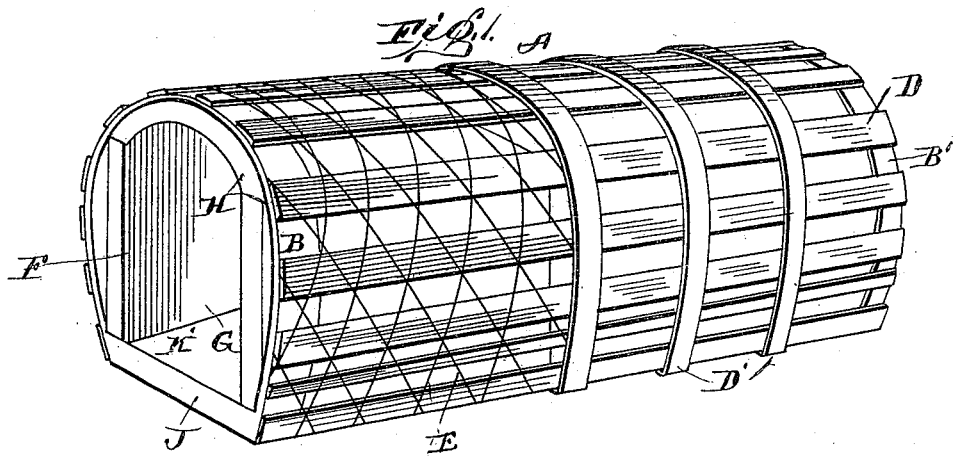
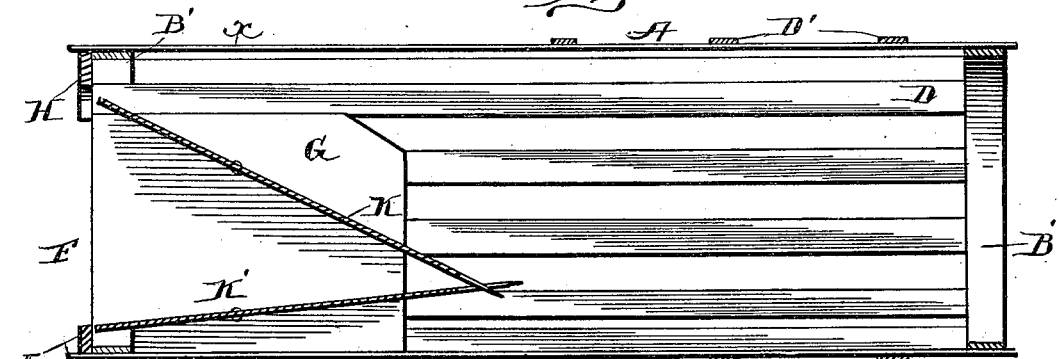
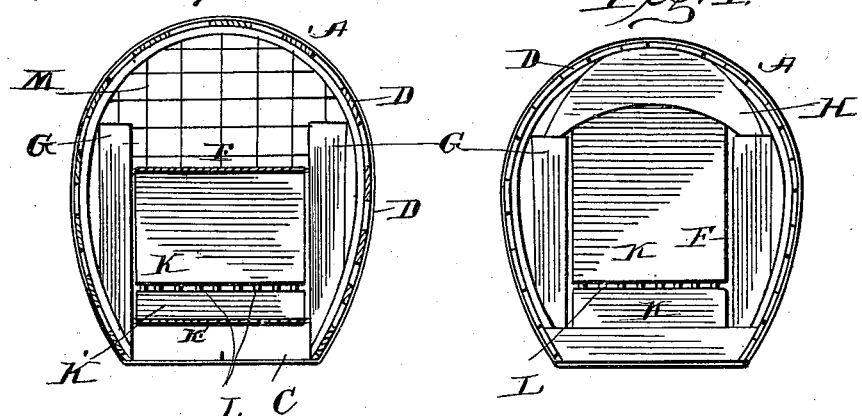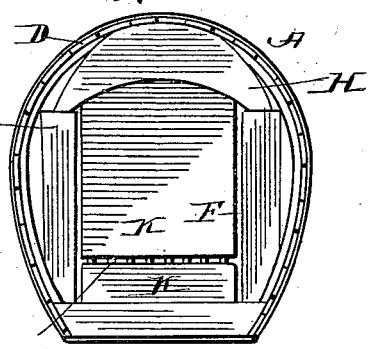
Witnesses:
J. M. Fowler Jr.
M. C. Savage.
Inventor:
John W. Watts
by
H. W. Legg
Attorney
THE NORRIS PETERS CO., PHOTO-LITHO., WASHINGTON, D. C.

UNITED STATES PATENT OFFICE.

JOHN W. WATTS, OF SPRINGFIELD, ILLINOIS.

FISH-TRAP.

SPECIFICATION forming part of Letters Patent No. 644,386, dated February 27, 1900.

Application filed October 4, 1899. Serial No. 732,484. (No model.)

*To all whom it may concern:*

Be it known that I, JOHN W. WATTS, a citizen of the United States, residing at Springfield, in the county of Sangamon and State of Illinois, have invented certain new and useful Improvements in Fish-Traps; and I do hereby declare the following to be a full, clear, and exact description of the invention, such as will enable others skilled in the art to which it appertains to make and use the same.

My invention relates to improvements in fish-traps, and has for its object a device that is durable in character, efficient in operation, and of comparatively-light cost, and one that can be readily repaired, if injured; and for this purpose it consists of a construction hereinafter described and claimed.

In the accompanying drawings, which form a part of this specification, Figure 1 is a perspective view of a fish-trap embodying my invention. Fig. 2 is a central longitudinal section thereof. Fig. 3 is a cross-section on line *x x* of Fig. 2. Fig. 4 is an end view.

Similar letters indicate like parts in the several figures.

A designates the frame or shell of the trap, consisting of the end pieces B B', to the outer faces of which are secured the longitudinal base or bottom pieces C C, of wood, and the side and top pieces D, also of wood, the said bottom pieces substantially forming a flat surface, so as to secure stability to the trap and prevent its rolling or overturning while immersed in the water, while the side and top pieces form a curved upper portion of the frame. On the outer side of the said bottom, top, and side pieces and intermediate of their ends are firmly secured a series of bands D', formed, preferably, of hoop or sheet iron, so as to add strength to the said pieces.

Embracing one or both of the ends of the frame A is a wire-netting E, as shown, which while permitting a free passage of the water firmly binds the parts of the frame in place.

Within one end of the frame A is a frame F, consisting of the side pieces G G, which are connected together and to the end pieces B of the frame A by the upper cross-piece H and the lower cross-piece J. The upper edges of the said side pieces G G are in close contact with and adapted to sustain the top pieces D for a portion of their length.

Pivoted on the side pieces G G are the upper and lower flaps K K', respectively, forming a gate or entrance into the trap. The inner end of the upper flap K is so weighted that it is normally lowered, while the outer end of the lower flap is the heaviest, causing its inner end to be normally raised, thereby normally causing the said flaps to meet and be closed at their inner ends, which latter are also provided with prongs L, projecting into the body of the trap. The opposite end of the trap is covered with a wire-netting M, which freely permits the passage of the water but not of the fish which has entered the trap. It will be seen that the gates K K' are readily opened by a fish from without by the mere pressure of its head against the same, so as to permit its entrance; but when it has passed therein any pressure against the inner ends of the said gates serves only to more firmly close the same, and thereby prevent its egress. The said side pieces G G' form, with the flaps K K', a guideway for the fish into the body of the trap.

The traps can be and are made of any convenient size and weight, according as the requirements may demand.

Having described my invention, what I desire to claim and secure by Letters Patent is—

1. A fish-trap consisting of an outer frame composed of end pieces with longitudinally-extending bottom, side, and top pieces secured thereto, an inner frame in one end of said outer frame secured to upper and lower cross-pieces connected with one of said end pieces, and a netting closing the opposite end of said first outer frame, said inner frame having side pieces with upper and lower pivoted gates thereon, substantially as described.

2. A fish-trap consisting of a frame of end pieces having secured to the outer faces longitudinal bottom, side, and top pieces, an inner frame secured by cross-pieces to said end pieces, said inner frame having side pieces forming bearings for pivoted flaps normally closing at their inner ends, and wire-netting forming the opposite end of the trap from said gate-entrance, substantially as described.

3. A fish-net consisting of an outer frame having substantially a flat bottom and curved top and sides, an inner frame secured in one end of said outer frame and provided with side pieces normally sustaining end portions of said top pieces, and forming bearings for pivoted flaps normally closing at their inner ends, and a wire-netting forming an end for said trap opposite the entrance end thereof, substantially as set forth.

In testimony whereof I affix my signature in presence of two witnesses.

JOHN W. WATTS.

Witnesses:
   WILLIAM THOMPSON,
   FRED. JAMERSON.